(12) United States Patent
Khan

(10) Patent No.: US 7,941,935 B2
(45) Date of Patent: May 17, 2011

(54) DEVICE AND METHOD FOR TRAILER AXLE WHEEL ALIGNMENT

(76) Inventor: Gulshair Khan, Sherwood Park (CA)

( * ) Notice: Subject to any disclaimer, the term of this patent is extended or adjusted under 35 U.S.C. 154(b) by 124 days.

(21) Appl. No.: 12/180,422

(22) Filed: Jul. 25, 2008

(65) Prior Publication Data

US 2009/0045602 A1    Feb. 19, 2009

Related U.S. Application Data

(63) Continuation-in-part of application No. 11/263,963, filed on Nov. 2, 2005, now Pat. No. 7,404,258.

(51) Int. Cl.
*G01B 5/00* (2006.01)

(52) U.S. Cl. .......................... 33/645; 33/288

(58) Field of Classification Search ............ 33/645, 33/193, 203.18, 600, 603, 608, 612, 288, 33/264, 755, 759, 760, 768, 769, 770; 280/477; 116/28 R See application file for complete search history.

(56) References Cited

U.S. PATENT DOCUMENTS

| | | | | |
|---|---|---|---|---|
| 1,804,448 A * | 5/1931 | Wochner | ............... | 33/203.17 |
| 2,479,723 A * | 8/1949 | Brown | ............... | 33/193 |
| 2,581,021 A * | 1/1952 | Jacobsen et al. | ............... | 33/288 |
| 2,877,560 A * | 3/1959 | Brown et al. | ............... | 33/193 |
| 3,203,103 A * | 8/1965 | McElfresh et al. | ............... | 33/612 |
| 3,810,313 A * | 5/1974 | Hicks | ............... | 33/288 |
| 4,386,468 A * | 6/1983 | Whitney | ............... | 33/608 |
| 4,413,420 A * | 11/1983 | Hoffman et al. | ............... | 33/608 |
| 4,569,140 A * | 2/1986 | Hobson | ............... | 33/203.18 |
| 4,942,667 A * | 7/1990 | Fournier | ............... | 33/288 |
| 5,343,628 A * | 9/1994 | Ham | ............... | 33/608 |
| 7,404,258 B2 * | 7/2008 | Khan | ............... | 33/645 |
| 2005/0005461 A1 * | 1/2005 | Rohrig | ............... | 33/203.18 |

* cited by examiner

*Primary Examiner* — Amy Cohen Johnson
(74) *Attorney, Agent, or Firm* — Stephen R. Burri; Island IP Law

(57) ABSTRACT

A device and method for aligning with a king pin or drawbar swivel eye on a trailer comprising a linear crossbar connectable to a kingpin or drawbar swivel eye to permit measurement along the side of the trailer between one or more axles and the ends of the crossbar for alignment of axles.

13 Claims, 9 Drawing Sheets

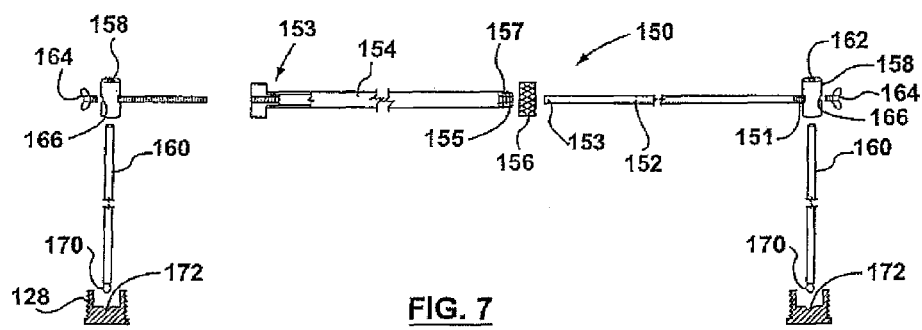
FIG. 7
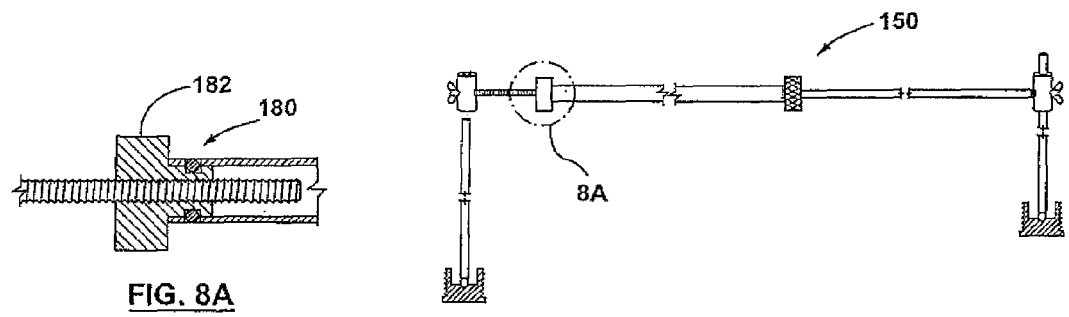
FIG. 8A
FIG. 8

DEVICE AND METHOD FOR TRAILER AXLE WHEEL ALIGNMENT

RELATIONSHIP TO OTHER APPLICATIONS

This application is a continuation-in-part of U.S. patent application Ser. No. 11/263,963 filed Nov. 2, 2005.

FIELD OF THE INVENTION

This invention relates to vehicle wheel alignment. In particular, the invention relates to tools and methods for aligning axles with a king pin or other coupling device.

BACKGROUND OF THE INVENTION

The transportation of goods by truck, rig and trailers is a key industry in modern society. However, it is not unusual for the axle or axles on a trailer to become misaligned. This may occur on account of the trailer wheels striking an abutment, from the trailer body becoming bent, or from some other reason. Such out of alignment conditions of the axle or axles of a trailer may lead to rapid tire wear which may result in increased expenses for the trailer owner or create hazardous conditions which may cause jackknifing and make it difficult to control the trailer on the road.

Furthermore, there is a lateral drag on the back end of the trailer which in turn causes tire wear on the trailer tractors and difficulties in handling the tractor. Accordingly it is not unusual for tractors to run at excessive torquing. All of these conditions create unnecessary fuel consumption, deterioration in the life of the tractor, tires wearing prematurely, strain on engine parts and increased engine down time.

Accordingly, there is a need for devices to measure the distance between a plurality of axles on a trailer, and between the axles and the kingpin or coupling device such as a drawbar swivel eye. There is also a need for an improved method for aligning the axles on a vehicle.

There have been a number of arrangements heretofore which have been designed for aligning axles for trailers. For example some operators use a tape measure to measure the distance between the center line of the king pin and the ends of each axle. This tends to be inaccurate as the tape tends to sag. Furthermore obstacles under the trailer are encountered by the sagging tape making it difficult to obtain an accurate reading.

Other arrangements are shown in U.S. Pat. No. 2,479,723 which relates to a method and means for aligning the rear axles of trailers. Furthermore, U.S. Pat. No. 2,590,722 relates to a device for aligning the wheels and axles of a vehicle in relation to the line of draft of the vehicle.

Moreover, U.S. Pat. No. 2,632,256 relates to an axle alignment device while U.S. Pat. No. 2,845,718 relates to gauging and aligning devices for vehicle axles.

Another arrangement for aligning of axles of trailers is shown in U.S. Pat. Nos. 2,877,560, 3,088,214 and U.S. Pat. No. 3,137,076.

U.S. Pat. No. 3,162,950 also relates to a method and means for a trailer axle alignment while U.S. Pat. No. 3,279,084 relates to a trailer axle misalignment and wheel runout indicator and method.

Other arrangements for axle aligning are discussed in U.S. Pat. Nos. 3,325,905, 3,566,476, 3,686,770, 3,962,796, and U.S. Pat. No. 4,055,899.

U.S. Pat. No. 4,347,668 relates to apparatus for aligning the axles of trailers having an instrument case connected by an elongated spring-loaded cable to the trailer king pin and connected by a pair of cables to clips releasably fastened on space location to the trailer axle.

Furthermore, U.S. Pat. No. 4,413,420 relates to a vehicle geometry checking apparatus or U.S. Pat. No. 4,569,140 relates to a thrust line wheel alignment apparatus and method.

Moreover U.S. Pat. No. 4,800,651 relates to an apparatus and method for aligning axles with respect to the frame of the vehicle and for determining wheel camber thereof.

Furthermore, U.S. Pat. No. 4,942,667 illustrates a portable apparatus for aligning the axles of a tractor, a trailer, or other vehicle for detecting bins, bows, twists and other irregularities in vehicle frames which a light source has used to provide a reference plane from which measurements can be taken. Such arrangement illustrates a complicated and expensive means for aligning axles on a trailer.

Further, U.S. Pat. No. 5,125,164 relates to a portable axle and frame alignment tool while U.S. Pat. No. 5,157,838 shows a vehicle axle alignment instrument and method.

A tandem axle alignment device is illustrated in U.S. Pat. No. 5,367,778 while U.S. Pat. No. 6,021,576 relates to a trailer trammel. Finally, U.S. Pat. No. 6,233,837 relates to an axle alignment system which includes a transmitter, reflector and an indicator area.

These and other devices and methods described are relatively complicated and expensive means for aligning the axles on a trailer.

SUMMARY OF THE INVENTION

According to one embodiment of the present invention, there is provided an improved device and method for aligning at least one axle of a wheel relative to the king pin or other coupling device of a trailer.

There is provided a device for aligning with a kingpin on a trailer having a linear crossbar at least 9 feet long having opposed first and second ends and marked at the midpoint between the first, and second ends; connection means for connecting the crossbar to a kingpin, T-bar means for positioning the crossbar relative to the trailer chassis; and tape securing means for receiving and retaining a tape measure.

The crossbar may have a square cross section and may be manufactured of aluminum.

The connection means may have a kingpin bearing having first and second bearing elements, each of the first and second bearing elements a semicircular channel to accommodate placement of a kingpin or other coupling device through the circular opening formed between the first and second bearing elements, the first bearing element attachable to the crossbar and the second bearing element attachable to the first bearing element.

The tape securing means may include first and second tape retainers, each attached perpendicularly to an opposing end of the crossbar and having a slot cut proximal to one end of the tape retainer of dimensions sufficient to permit passage therethrough of the end of a measuring tape, while retaining the end of the measuring tape when the tape is under tension.

The T-bar means may include a pair of U-clamps attachable to the crossbar, nuts and bolts for securing the U-clamps to the crossbar, T-bar retaining means on each U-clamp, and a T-bar. The base of each U-clamp may be square.

The T-bar retaining means may have a base element welded to each U-clamp, with a slot cut in the exposed surface of the base element to correspond to the width of the shaft of the T-bar and a stud to each side of the slot for receiving a cap element, the cap element having a corresponding slot therein corresponding to the width of the T-bar shaft and attachable with nuts corresponding to the studs of each of the base elements to form slots for receiving the shaft of a T-bar. Each T-bar may have a linear strip of metal aluminum welded and braced perpendicularly at its midpoint to a shaft.

According to the present invention, one method of aligning at least one axle on a trailer having a king pin using the device of claim 1, may include the steps of loosely fastening the kingpin bearing in the center of the crossbar to the kingpin; mounting the U-clamps and T-bar assemblies onto the crossbar, one on each side of the trailer; adjusting the T-bars vertically to the height of the trailer's chassis and tightening the nuts to hold the T-bar in line with the trailer's chassis; positioning the T-bars tightly against the chassis of the trailer and tightening the T-bar retaining slots; tightening the kingpin nuts; measuring using a measuring tape the distance between the end of the crossbar to the center of the first axle on each side of the trailer; adjusting the first axle to equalize the distance between the first axle and the crossbar on each side of the trailer; and repeating the preceding two steps for each additional axle.

According to another embodiment, the device of the present invention may be for use in axle alignment for trailers and tankers equipped with drawbar swivel eyes, and may further comprise a pin insertable through a drawbar swivel eye, a bolt extending upwardly from the center of the pin, first and second protective plates, a washer and a nut, and wherein a hole is drilled through the center of the crossbar.

The bolt may extend from the center of the pin on one side of the swivel eye. Each protective plate may be a flat steel plate ⅛ inch×1½ inches×6 inches and having a ½ inch hole through its center to corresponding to the hole drilled through the crossbar. The washer and nut may be selected to operate with the bolt extending from the pin inserted through the swivel eye.

According to the present invention, one method of alignment of the axles of a trailer having a drawbar swivel eye using the device of claim 11, may include the steps of passing the pin and bolt through the drawbar swivel eye from the bottom with the bolt oriented upwardly; positioning a first protective plate over the bolt; placing the crossbar over the bolt and aligning it with the first protective plate; positioning a second protective plate over the bolt above the crossbar and aligning it with the crossbar; placing the washer and nut over the bolt and fastening them loosely; aligning the crossbar to the sub-frame of the trailer by equalizing the distance between the crossbar and the sub-frame at a point on each side of the crossbar which is half the width of the sub-frame from the center mark of the crossbar; tightening the nut to secure the position of the crossbar; measuring using the measuring tape the distance on each side between the end of the crossbar and the center of the first axle; adjusting the first axle to equalize the distance between the first axle and the crossbar on each side; and repeating the preceding two steps for each additional axle.

These and other objects and features of this invention shall now be described in relation to the following drawings:

BRIEF DESCRIPTION OF THE DRAWINGS

FIG. 7 is an exploded view of the tool for measuring the distance between axles on a vehicle.
FIG. 8 is an assembled view of FIG. 7.
FIG. 8A is a partial sectional view of FIG. 8.

DETAILED DESCRIPTION OF THE INVENTION

Figure 1:
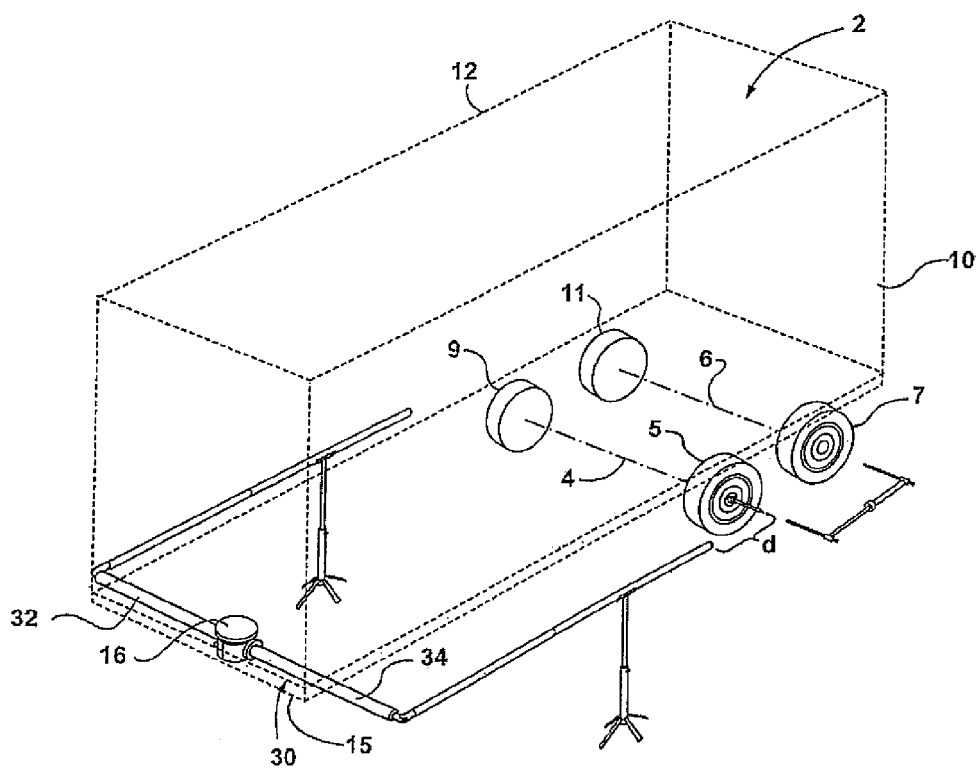
FIG. 1 is a perspective view of one embodiment of this invention.

In the description which follows like parts are marked throughout the specification and in the drawings with the same respective reference numbers. Drawings are not necessarily to scale and in some instances proportions may have been exaggerated in order to more clearly depict certain features of this invention.

FIG. 1 generally illustrates the trailer to having a plurality of axles. In the drawing a first and second axle 4 and 6 are shown, each having wheels 5 and 7 on one side of the trailer 10 respectively and wheels 9 and 11 on the other side 12 of the trailer 2 respectively. Any number of axles can be presented including one axle.

The trailer 2 is generally attached to a tractor (not shown) whereby the king pin 14 is attached to the tractor by means of a fifth wheel in the manner well known to those persons skilled in the art. The king pin 14 includes the king pin flange 16 which attaches to the trailer (not shown) in a manner well known to those persons skilled in the art.

Over time the wheels 5, 7, 9 and 11 become misaligned from a number of factors including bumping into curbs, or normal wear so that the trailer 2 no longer runs true. In other words, one of the wheels 5, 7, 9 and 11 may be pulling in a direction which is not in alignment with the forward thrust of the trailer 2. Accordingly, the relative distance between the king pin 14 and the wheels 5 and 9 are no longer equal. Furthermore, the distance between the axles of wheels 5 and 7 and 9 and 11 may also be different over time.

Figure 2:
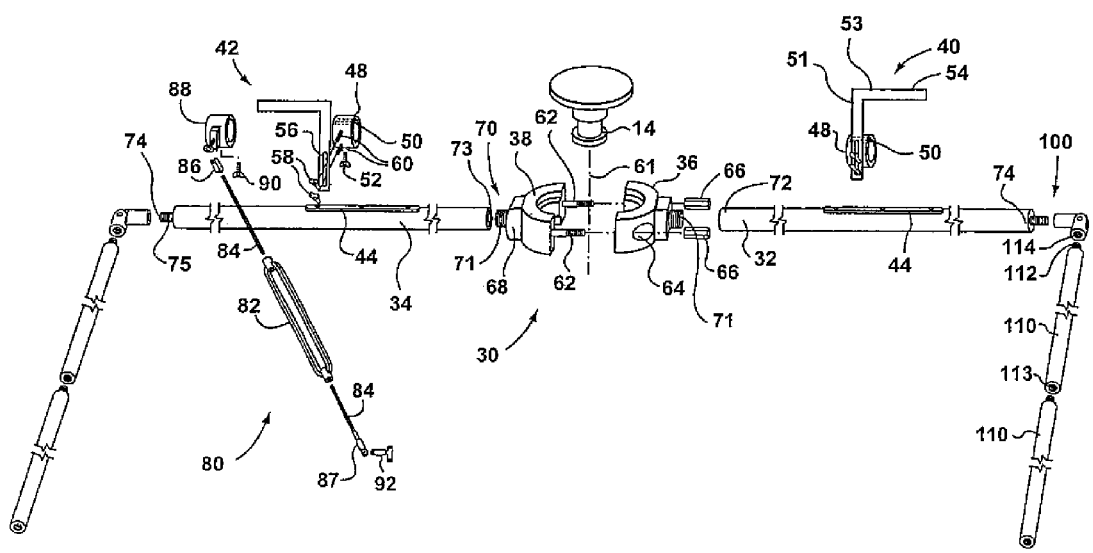
FIG. 2 is an exploded view of the device for aligning with a king pin on a trailer.
Figure 3:
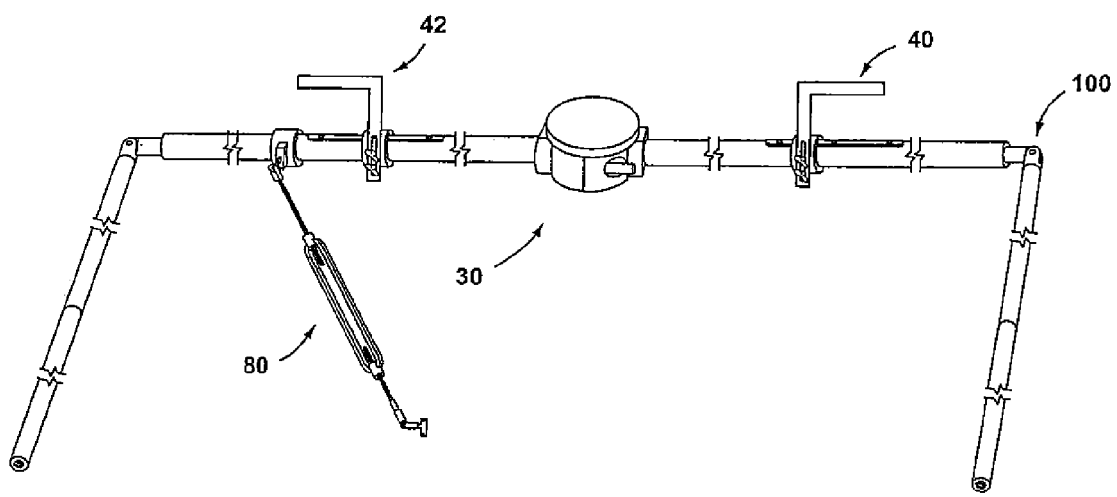
FIG. 3 is an assembled view of FIG. 2.

FIG. 1 generally illustrates a device 30 for alignment with a king pin 30 which is more fully particularized in FIGS. 2 and 3.

The device 30 for aligning or squaring the king pin onto the frame of a trailer 2 includes a first cross bar or bar 32 and a second bar 34 where the first bar 32 includes a first coupler 36 while the second cross bar or bar 34 includes a second coupler 38'. The first and second couplers 36 and 38 are adapted for attachment to the king pin 14 as shown in FIGS. 2 and 3. Each of the bars 32 and 34 has projecting therefrom alignment or squaring means 40 and 42. Furthermore, the first and second bars 32 and 34 include a key 44. The key 44 can in one embodiment comprise a piece of material as shown which is connected to the bars by bolts or studs as shown. In other words, the key is fixed to the cross bars.

Each squaring means 40 includes a collar 48 which is adapted to be slidingly received by the bars 32 and 34. Each collar 48 also includes a keyway 50 which is adapted to receive the same key 44. The collar 48 includes fastening means such as a wing bolt 52 which is adapted to removably fasten the collar 48 and particularly the squaring means 40 to the first and second bars 32 and 34 as shown. The squaring means 40 also includes a square 54 which includes a slot 56 adapted to receive securing means such as wing nuts 58 adapted to protrude through the slot 56 into holes 60 presented by the collar as shown. The wing nuts permit slight tilting of the squares relative the bars 32 and 34 as the threaded bolts protruding through the slot 56 are smaller than the slot 56.

The square 54 includes an edge 53 which is parallel to the axis of the bars 32 and 34 and perpendicular to the squaring edge 51.

In this way the assembled collar shown in FIG. 3 may be squared with the trailer and particularly the trailer frame by utilizing the squaring means 40 relative thereto so as to, in affect, transfer the distance from the axis 61 of the king pin 14 to the sides 10 and 12 of the trailer 2 so as to simplify the measurement of the distance from the king pin 14 to the first axis 4.

The couplers 36 and 38 generally comprise U-shaped bearing halves which are adapted to be secured to the king pin 14. In particular, one of the couplers 38 includes fastening means such as bolt 62 adapted to be received by aligned holes 64 through the coupler 36. A plurality of hex nuts 66 can be used to assemble the couplers together. The couplers also include a portion 68 which includes means 70 for attachment to one end 72 of the first and second bars 32 and 34. In particular, the means 70 can comprise a male threaded part 71 adapted to be threadedly engaged by female threaded part 73 presented at one end of the pins 32 and 34 as shown. The other end 74 of first and second bars 32 and 34 also include a male threaded part 75 which, when assembled together, extends beyond the sides 10 and 12 of the trailer 2 as shown.

The device for aligning with or squaring the king pin 30 can be comprised of a variety of material such as aluminum, steel, brass, copper plastic or the like. Furthermore the equipment described herein should not be limited to any shape or size. In the embodiment shown the couplers 36 and 38 and bars 32 and 34 can be comprised of aluminium so as to be light weight. The members 68 and 71 however can be comprised of steel for durability.

Furthermore, the couplers 36 and 38 are adapted to be secured and unsecured with respect to one another so as to present a kit which can be easily stored in a small space.

Moreover, when the bars 32 and 34 are threadedly attached to the couplers 36 and 38 and the center line of the keyways will be aligned with respect to each other and will be arranged so as to be perpendicular to the axis 61 of the king pin 14 as well as the couplers 36 and 38. This assists in the squaring procedure.

Moreover, the squaring means 40 may be adjusted up or down relative to the sleeves 48 and the bars 32 and 34 by loosening nuts 58 so that the square 54 can slide relative the sleeve 48. Once in the desired location the wing nuts 58 can be tightened so as to contact the underside of the trailer 2 and also assist for easy squaring.

A stabilizing means 80 can be included which consists of a turnbuckle 82 and two threaded rods 84 having a universal joint 86 and 87 attached at either ends thereof as shown. One of the universal joints 86 is attached to a sliding sleeve 88 which can be slid along one of the bars and secured thereto by a wing nut 90 while the other universal joint 87 is connected to connecting means 92 that can be connected to the underside of the trailer so as to secure or rejudify the alignment of the device 30 relative to the trailer 40.

Accordingly, by utilizing the device 30 as shown herein the distance from the outer end 74 of bars 32 and 34 can now be used to measure to the axis of the wheel 5 and 9. In other words the center line 61 of the king pin 14 is in effect transferred from underneath the trailer to either side of the trailer 2 for easy measurement (once the device 30 is aligned ie the center line of the bars 32 and 34 are parallel to the front edge 15 of the trailer 2.

The other end 74 of the bars 32 and 34 include a male thread which is adapted to receive a universal 100 as shown. The universals 100 present a 90° angle between the axis of the measured rods 110 and the bars 32 and 34 in a manner to be described herein.

In some of the prior devices the distance between the king pin and the axis of the wheels were measured by tape measure from the kingpin 14 to the wheels which tended to sag. Accordingly, inaccuracies arose.

By utilizing a plurality of measured rods 110 as described below, the accuracy of alignment is greatly improved.

Each of the measured rods 110 can consist of selected lengths. In the invention described herein each of the lengths of the measured rods 110 are equal. However, they do not have to be equal and any number of selected lengths can be selected.

Each of the measured rods 110 have a male threaded part 112 which is adapted to be threaded into a female threaded part 114 presented by the universal 100. The other end of the measured rod 110 includes a female threaded part 113 which is adapted to receive the male threaded part 112 of another measured rod 110. In this way the distance between the other end 74 of the device 30 and the first axis 4 can be closed.

In one embodiment the measured rods 110 are all exactly 5 feet in length and have ½ inch male threads on one and ½ inch female threads at the other end. The threaded parts can be made of steel for durability and can be numbered for example from $A_1$ to $A_5$ and $B_1$ to $B_5$. These measured rods can be joined together by screwing into the first piece into the universal joint at one end of the king pin bearing crossbar 30 leading to the rear towards the first axle.

Figure 4:
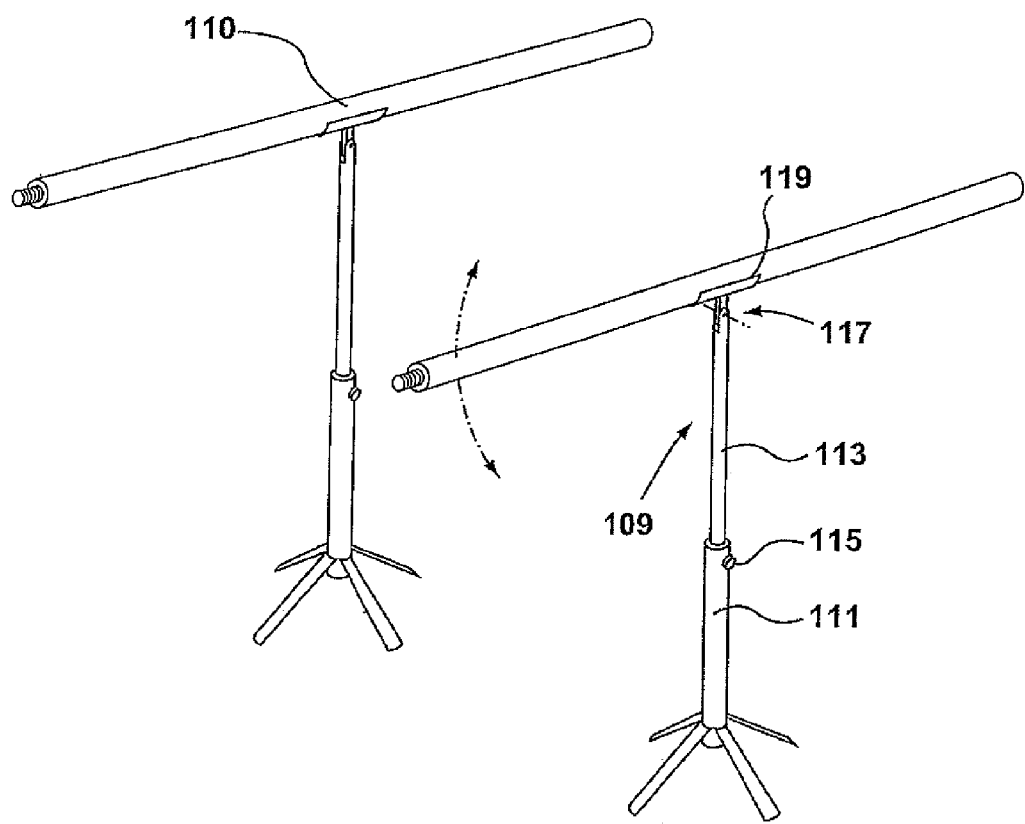
FIG. 4 illustrates a means for holding the measured rods.

As the height of the king pin 14 is generally higher than the center of the first axle, the measured rods 110 can sit on an adjustable stand 109 as shown in FIG. 4 to minimize sagging of the rods 110. The number of measured rods that are used depends on the length of the trailer unit. The adjustable stand 109 can have telescoping members 111, 113 with securing member 115 such as a bolt to fix the telescoping members together at the appropriate height to minimize sagging of measured rods 110. Also, the stand 109 includes a flexible or pivoting connection 117 for adjustment of the seat 119 and the measured rods 110 that rest on the seat 119 at appropriate angles to the horizontal. In one embodiment, for example, the seat 119 can flex 180° to create any angle there between from the higher located king pin 14 to the lower axle. However, the seat 119 could flex at any angle.

In this way the distance between the end 74 and the center of the axis is closed.

Figure 5:
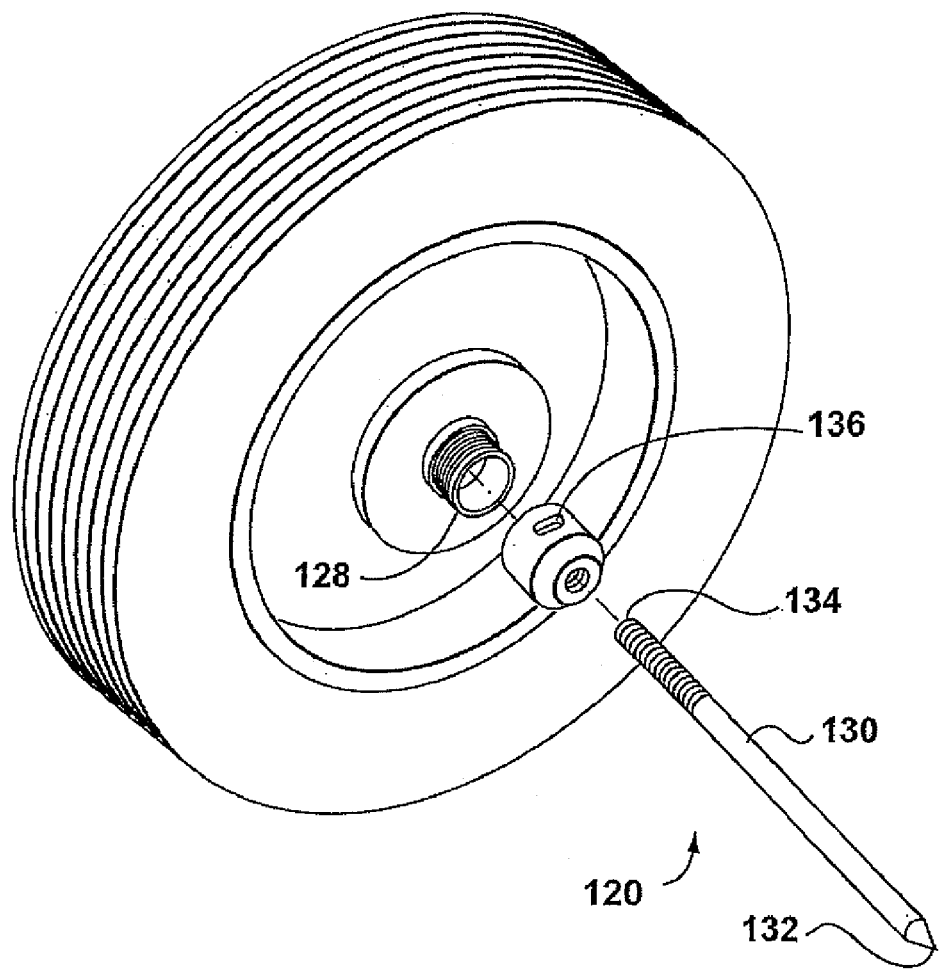
FIG. 5 is an exploded view of the axle extenders.
Figure 6:
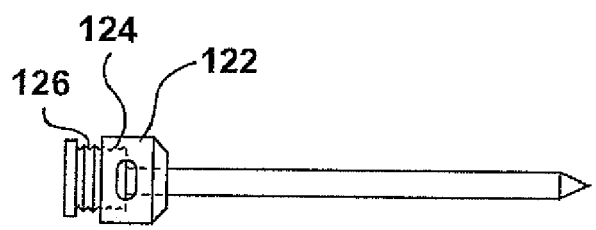
FIG. 6 is an assembled view of FIG. 5.
Figure 9:
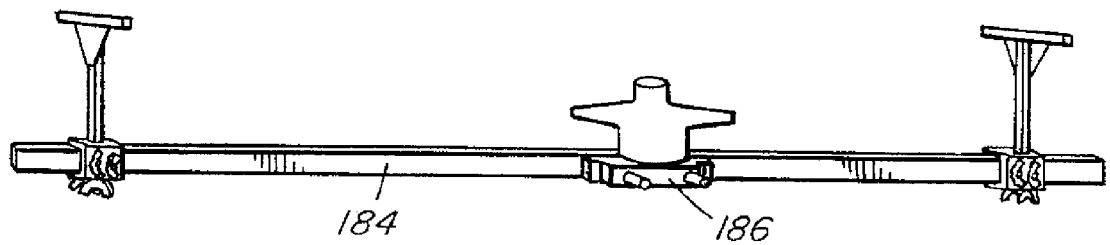
FIG. 9 is perspective view of the kingpin alignment device of the invention.
Figure 10:
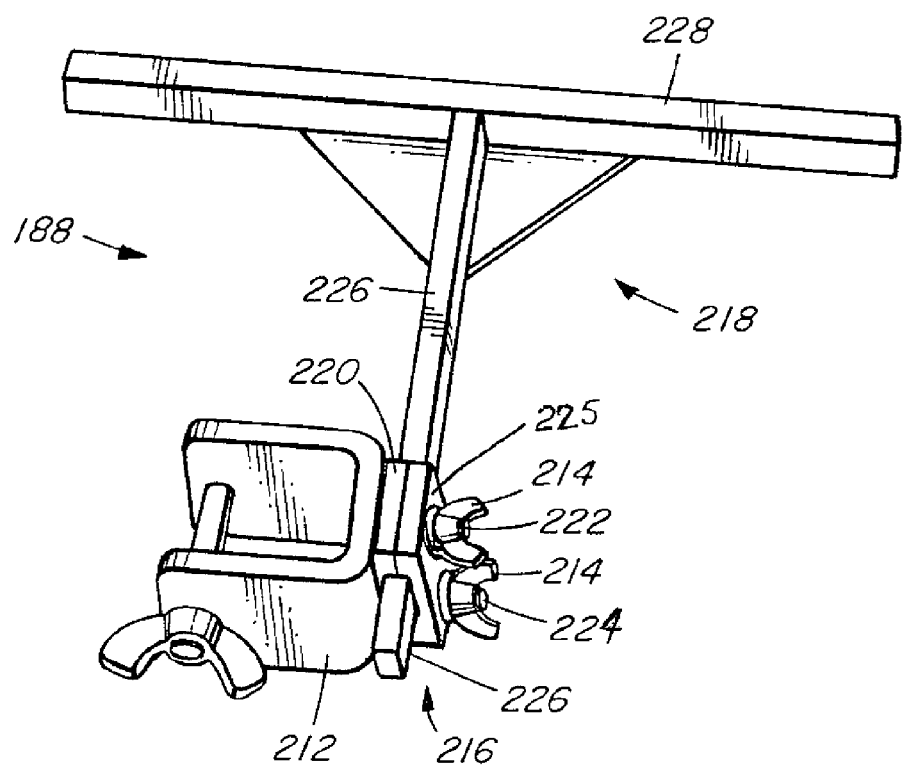
FIG. 10 is a perspective view of the T-bar means of the invention.
Figure 11:
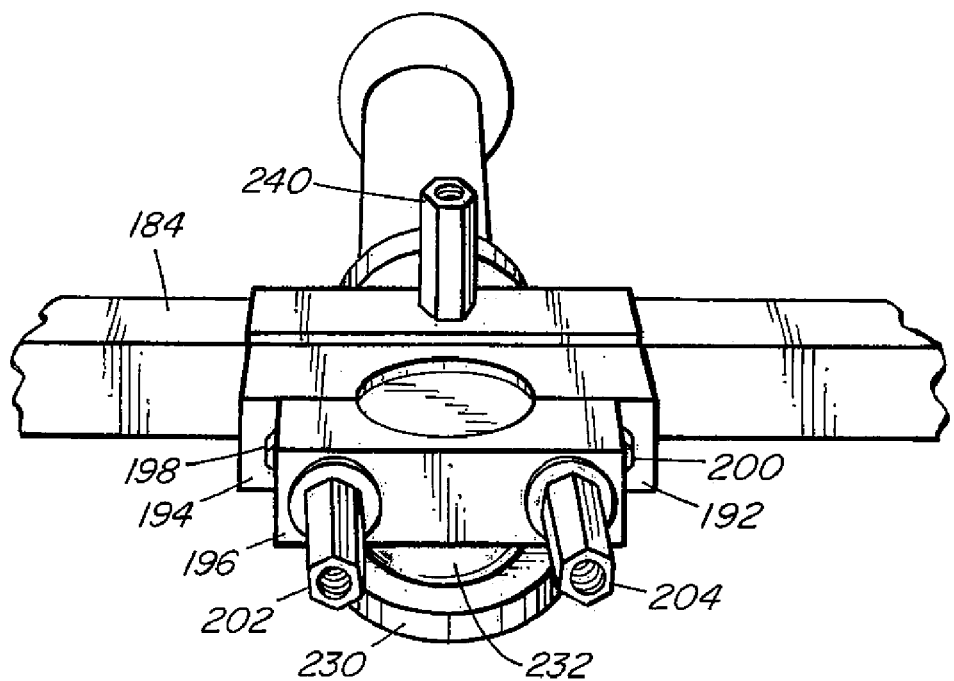
FIG. 11 is a perspective view of the device of the invention connected to a drawbar swivel eye.
Figure 12:
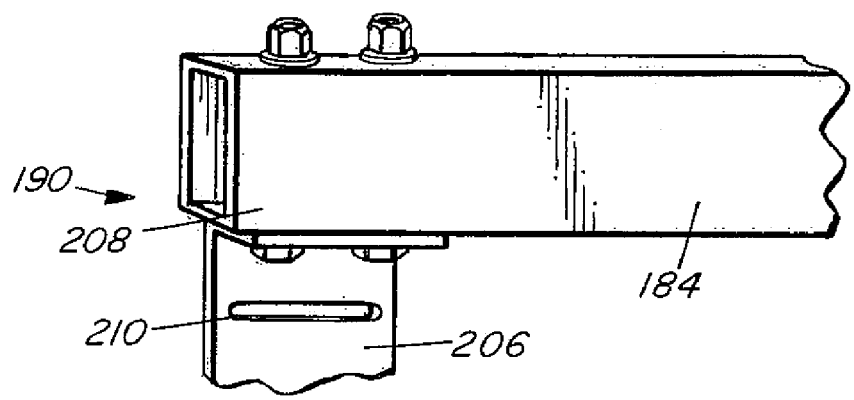
FIG. 12 is a perspective view of the tape securing means of the invention.
Figure 13:
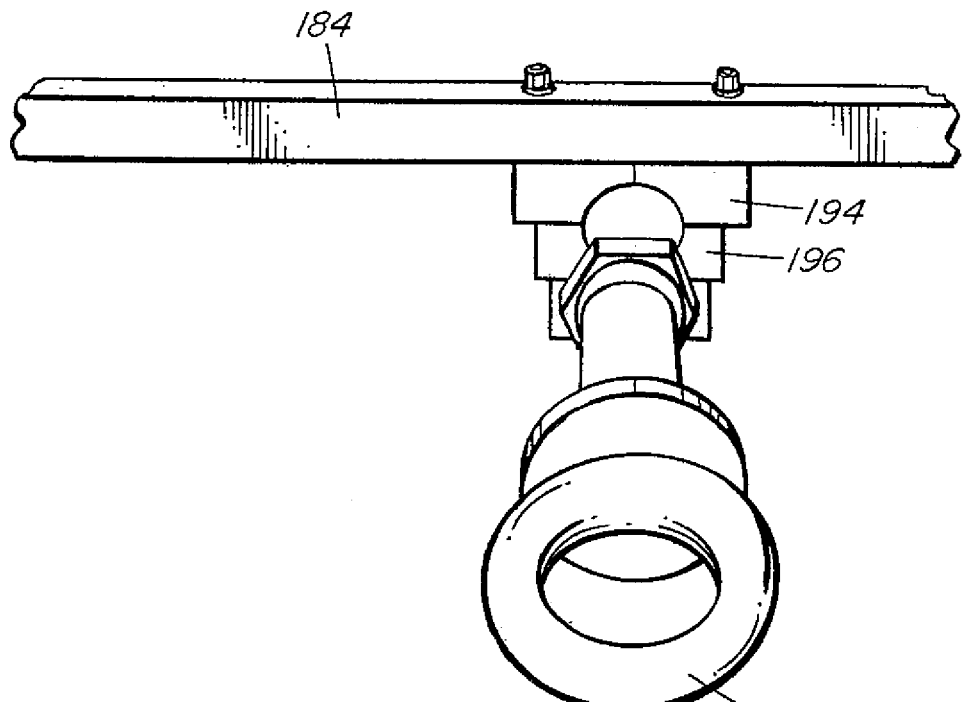
FIGS. 13 and 14 depict alternate embodiments of a drawbar swivel eye and insertable pin.
Figure 14:
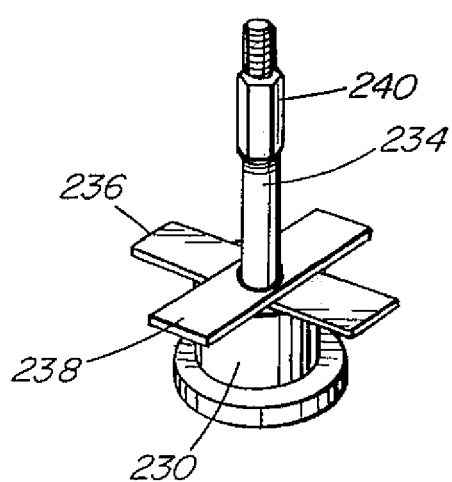

In order to improve the accuracy of the reading between the end 74 and the center of the first axis, an axis extender 120 as shown in FIGS. 5 and 6 can be used. The axis extender 120 include a hollow threaded housing 122 having an internal thread 124 which is adapted to be threaded to an external thread 126 presented by the axis hub 128. The housing 122 is adapted to receive the axis pointer 130 which has one pointed end 132 and another end 134 which is adapted to contact of the axis so as to thereby point or project the axis of the trailer outwardly. The axis pointer end 134 is adapted to screw into housing 122 at the outer end as shown.

In order the ensure that the second end 134 of the axis extender 130 contacts the axis on both sides 10 and 12 a window 136 is presented so as to ensure that the end 134 contacts the axis; otherwise inaccurate readings may occur. The axis extender 130 is secured to the housing by means of male threads engaging with internal female threads presented in the housing as shown in FIG. 5.

Accordingly, the distance d (see FIG. 1) may now be easily read by a tape measure or other means so as to obtain the distance between the end 74 on one side 10 of the trailer as shown. In the example illustrated above, if four measured rods were connected as described, the distance d would represent four times the 5 feet or 20 feet. Thereafter the distance would be measured from the end of the last measured rod 110 and the pointer of the axis extender 132. If the distance d was 4 inches thereby the distance from the end 74 on one side 10 to the axis of wheel 5 would be 20 feet 4 inches. The same measurement would be taken on side 12 of the trailer and compared. If the distance was different from that on side 10 the wheels 9 could be adjusted in a manner well known to those persons skilled in the art so as to substantially equalize the distance on both sides. In this way the first axis 4 would be adjusted and be substantially parallel to edge 15.

In order to align the second axis relative to the first axis the device 30 can be removed as well as the axis extender 120.

Thereafter the tool 150 shown in FIGS. 7 and 8 for measuring the distance between axis 4 and 6 can be utilized.

The measuring tool 150 comprises of two telescoping members 152 and 154 which can be selectively adjusted in length and locked relative to one another by knurled nut 156. In one embodiment the end of one of the telescoping pieces 154 can be slotted at 157 as shown. The nut 156 is threaded onto the end of 157 of the fingers 155. The fingers are tapered and grasp end 153 of the other telescoping rod so as to be secured thereto. However other means can be used.

The outer ends 151 and 153 of telescoping rods 152 and 154 are connected to a hollow sleeve 158 which are adapted to slidingly receive therein measuring rods 160. The measuring rods 110 are for secured in the bore 162 by means of a threaded head wing bolt 164 which is adapted to be received by threaded hole 166 of the sleeve 158. Accordingly, each telescoping member 152 and 154 has selectively displaceable axle contacting rods 160 projecting outwardly therefrom from measuring the distance between the axles 4 and 6 on one side of the trailer. This measured distance is then compared to the measured distance between the axis 4 and 6 on the other side 12 of the vehicle. Each of the axle contacting rods 160 includes a rounded end 170.

Most trailer axles have a counter sunk hole 172. By utilizing a rounded end 170 the rounded end easily and snugly fits into the counter sink 172 between axles 4 and 6 so as to easily measure the distance between the axles. It should be noted that at the counter sink in many of the axles is an inherent part and in some cases has been formed by locating the axle when manufactured in a lathe. In some cases the counter sink may need to be exposed if a hubcap is utilized. The tool 150 can be utilized by one person as the rounded ends easily locate in the counter sink 172.

A fine adjustment mechanism 180 is located on one of the telescoping members as shown, can be utilized so that the user can turn the knurled nut 182 and accurately measure the distance between axles 4 and 6.

The device shown in FIGS. 7 and 8 may include numbers or measuring indicia or alternatively, may be devoid of any measurements apart from the fact that the distance between axles 4 and 6 may be set by the device shown in FIG. 7 and thereafter compared with the distance between the axis on the other side of the trailer. If necessary the distance can be adjusted in an appropriate manner so as to substantially adjust the axles 4 and 6 on each side of the trailer to be equal.

By utilizing the invention described herein one obtains the following advantages: more accurate readings; better fuel economy; less global warming; tires, engine last longer; perception that the loads are lighter; and less repair work.

According to another embodiment of the present invention, as shown in FIGS. 9-13, there is provided a simplified alignment device comprising a crossbar 184, connection means 186 for connecting the crossbar to a kingpin, T-bar means 188 for positioning the crossbar relative to the trailer chassis, and tape securing means 190 for retaining a tape measure for measuring distances between the crossbar and one or more trailer axles.

The crossbar may be a linear pipe, preferably having a rectangular cross section, ideally a square cross section. The crossbar should be at least 9 feet long to allow its opposing ends to extend beyond the opposing sides of the trailer adjacent the position of the kingpin. The crossbar is preferably manufactured of aluminum, but other materials may also be used. Preferably, the width and height of the crossbar are 1.5 inches, but other dimensions are possible provided the pipe remains sufficiently large to permit bolts and kingpins to be inserted through it, and small enough to permit ease of handling. The crossbar further comprises a marking at a point midway between its opposed ends. For a 9 foot pipe, the center marking would be placed at 4 feet 6 inches from each end.

The connection means for connecting the crossbar to a kingpin may comprise a kingpin bearing 192 made from first and second bearing elements (194, 196) manufactured of metal, preferably 1½ inch square aluminum, each with its center marked. Each of the first and second bearing elements have a semicircular portion removed to accommodate placement of a kingpin or other coupling device in the opening formed when the first and second bearing elements are positioned together. The first bearing element is longer to accommodate a pair of bolts (198, 200), one to each side of the center mark, for bolting the first bearing element to the crossbar. The longer first bearing element is aligned, using the center marking, with the center of the crossbar, then bolted to the crossbar. The first and second bearing elements may be held together around a kingpin by two ½ inch studs and two ½ inch nuts (202, 204).

The tape securing means may comprise a pair of tape retainers 206 manufactured of metal, preferably angle aluminum 1.5 inches wide and 2 inches long. A tape retainer is affixed perpendicularly to each end 208 of the crossbar. Each tape retainer further comprises a horizontal slot 210 having dimensions sufficient to permit passage therethrough of the end of a measuring tape, while retaining the end of the measuring tape when the tape is under tension.

The T-bar means may comprise a U-clamp 212, nuts 214 for securing the U-clamps to the crossbar, T-bar retaining means 216 on each U-clamp, and a T-bar 218. The base of the U-clamp may be selected to fit with the shape of the crossbar. For example, for a crossbar having a square cross section, the U-clamp may have a square base. The U-clamps may be attached anywhere along the crossbar using a connection device, preferably a ⅜ inch wing head bolt.

T-bar retaining means are affixed to the outside of the base of the U-clamp. The T-bar retaining means may comprise a base element 220 welded to each of the U-clamps, with a slot cut in the exposed surface of the base element to correspond to the width of the T-bar shaft. A pair of studs (222, 224), one on each side of the slot, are attached. A cap element 225 having a slot therein corresponding to the width of the T-bar shaft is attachable with nuts 214 corresponding to the studs of each of the base elements, to form the slots for receiving the shaft 226 of a T-bar. The T-bars may be moved vertically within the slots until the nuts are tightened to hold the T-bars in place. Preferably the studs are ¼ inch studs.

Each T-bar may comprise a linear strip 228 of metal, preferably aluminum welded and braced perpendicularly at its midpoint to a shaft 226. The T-bar is of a dimension to fit between a trailers chassis and a fender, no larger than 1 inch in thickness.

According to one embodiment of the method of the present invention, alignment of the axles of a vehicle unit having three axles comprises the following steps:
1. The kingpin bearing in the center of the crossbar is bolted loosely on to the kingpin but not tightened, such that the crossbar may still be moved by hand.
2. The U-clamps and T-bars assemblies are mounted on to the cross-bar, one on each side of the trailer.
3. The T-bars are adjusted vertically to the height of the trailer's chassis and the ¼ inch wing nuts are tightened to hold the T-bar in line with the trailer's chassis.
4. The T-bars are positioned tightly against the chassis of the trailer, and tightened in the T-bar retaining slots with the wing head bolts.
5. The kingpin nuts are tightened.
6. Measurements are taken using the measuring tape between the end of the crossbar to the center of the first axle.
7. The first axle is adjusted to equalize the distance between the first axle and the crossbar on each side.
8. Measurements are taken using the measuring tape between the end of the crossbar to the center of the second axle.
9. The second axle is adjusted to equalize the distance between the second axle and the crossbar on each side.
10. Measurements are taken using the measuring tape between the end of the crossbar and the center of the third axle.
11. The third axle is adjusted to equalize the distance between the third axle and the crossbar on each side.

According to an alternate embodiment of the invention for axle alignment for trailers and tankers equipped with drawbar swivel eyes, the device of the invention may further comprise a pin 230 attachable through the drawbar swivel eye 232, a bolt 234 extending upwardly from the center of the pin, first and second protective plates 236, 238), a washer and a nut 240.

The drawbar swivel eye pin may be fitted with a bolt using a machine well known in the art. The ½ inch bolt may extend from the center of the pin on one side of the swivel eye.

The protective plates are preferably two flat steel plates ⅛ inch×1½ inches×6 inches and having a ½ inch hole through their centers corresponding to a ½ inch hole drilled through the crossbar. The two pieces of steel are placed one on top and one at the bottom of the crossbar to prevent the crossbar from being damaged. The washer and nut are selected to correspond in size to the bolt extending from the pin inserted through the swivel eye.

According to another embodiment of a method of the present invention, alignment of the axles of a trailer may comprise the following steps:
1. The pin and attached bolt is passed through the drawbar swivel eye from the bottom, with the bolt oriented upwardly.
2. A first protective plate is positioned over the bolt.
3. The crossbar is placed over the bolt and aligned with the first protective plate.
4. The second protective plate is placed over the bolt above the crossbar and aligned with the crossbar.
5. The washer and nut are placed over the bolt and fastened loosely to permit movement of the crossbar by band.
6. Align the crossbar to the sub-frame of the trailer by equalizing the distance between the crossbar and the sub-frame at a point on each side of the crossbar which is half the width of the sub-frame from the center mark of the crossbar. For example, if the subframe is 52 inches wide, the measurement from a point 26 inches to the left of the center mark to the corresponding left edge of the sub-frame should be equalized to the measurement from a point 26 inches to the right of the center mark to the corresponding right edge of the sub-frame.
7. Tighten the nut to secure the position of the crossbar.
8. Measurements are taken using the measuring tape between the end of the crossbar to the center of the first axle.
9. The first axle is adjusted to equalize the distance between the first axle and the crossbar on each side.
10. Steps 8 and 9 may be repeated for additional axles.

The measurements are made between the crossbar and the sub-frame as there is a rigid sub-frame with a drawbar swivel eye and a trailer is mounted on top of that. Other trailer constructions are known, but in all cases involving trailers measurements should be relative to the sub-frame as the sub-frame is built truer. The sub-frame is built together with the drawbar.

The embodiment comprising a one-piece crossbar makes the invention simpler to operate. This removes the need to align separate pieces of a multi-component crossbar.

Since changes in and/or additions to the above described best mode may be made without departing from the nature, spirit or scope of the invention, the invention is not to be limited to said details.

I claim:

1. A device for aligning with a kingpin on a trailer having a chassis, comprising:
   (a) a linear crossbar at least 9 feet long having opposed first and second ends and marked at the midpoint between the first and second ends;
   (b) coupling means for connecting the crossbar to a kingpin,
   (c) T-bar means for positioning the crossbar perpendicular to a longitudinal axis of a trailer chassis, wherein the T-bar means is a T-bar assembly comprising a pair of U-clamps attachable to the crossbar, nuts and bolts for securing the U-clamps to the crossbar, T-bar retaining means on each U-clamp, and a T-bar; and
   (d) tape securing means for receiving and retaining a tape measure, wherein the tape securing means comprises first and second tape retainers, each attached perpendicularly to an opposing end of the crossbar and having a slot cut proximal to one end of the tape retainer of dimensions sufficient to permit passage therethrough of an end of a measuring tape, while retaining the end of the measuring tape when the tape is under tension.

2. The device of claim 1, wherein the crossbar has a square cross section.

3. The device of claim 1, wherein the crossbar is manufactured of aluminum.

4. The device of claim 1, wherein the coupling means comprises a kingpin bearing having first and second bearing elements, each of the first and second bearing elements a semicircular channel to accommodate placement of a kingpin or other coupling device through the circular opening formed between the first and second bearing elements, the first bearing element attachable to the crossbar and the second bearing element attachable to the first bearing element, and a plurality of kingpin nuts.

5. The device of claim 1, wherein the base of each U-clamp is square.

6. The device of claim 1, wherein the T-bar retaining means comprises a base element welded to each U-clamp, with a slot cut in the exposed surface of the base element to correspond to the width of the shaft of the T-bar and a stud to each side of the slot for receiving a cap element, the cap element having a corresponding slot therein corresponding to the width of the T-bar shaft and attachable with nuts corresponding to the studs of each of the base elements to form slots for receiving the shaft of a T-bar.

7. The device of claim 1, wherein each T-bar comprises a linear strip of metal aluminum welded and braced perpendicularly at its midpoint to a shaft.

8. A method of aligning at least one axle on a trailer having one or more axles and a king pin using the device of claim 6, comprising the steps of:
- (a) loosely fastening the kingpin bearing in the center of the crossbar to the kingpin;
- (b) mounting a pair of U-clamps and a pair of T-bar assemblies onto the crossbar, one on each side of the trailer;
- (c) adjusting the T-bars vertically to the height of the trailer's chassis and tightening the nuts to hold the T-bar in line with the trailer's chassis;
- (d) positioning the T-bars tightly against the chassis of the trailer and tightening the T-bar retaining slots;
- (e) tightening the kingpin nuts;
- (f) measuring using a measuring tape the distance between the end of the crossbar to the center of the first axle on each side of the trailer;
- (g) adjusting the first axle to equalize the distance between the first axle and the crossbar on each side of the trailer; and
- (h) repeating steps (f) and (g) for each other trailer axle.

9. The device of claim 1 for use in axle alignment for trailers and tankers equipped with drawbar swivel eyes, further comprising a pin insertable through a drawbar swivel eye, a bolt extending upwardly from the center of the pin, first and second protective plates, a washer and a nut, and wherein a hole is drilled through the center of the crossbar.

10. The device of claim 9, wherein the bolt extends from the center of the pin on one side of the swivel eye.

11. The device of claim 9, wherein each protective plate comprises a flat steel plate ⅛ inch ×1½ inches ×6 inches and having a ½ inch hole through its center to corresponding to the hole drilled through the crossbar.

12. The device of claim 9, wherein the washer and nut are selected to operate with the bolt extending from the pin inserted through the swivel eye.

13. A method of alignment of one or more axles of a trailer having a drawbar swivel eye, one or more axles each with a longitudinal axis, and a sub-frame, using the device of claim 9, comprising the steps of:
- (a) passing the pin and bolt through the drawbar swivel eye from below with the bolt oriented upwardly;
- (b) positioning the first protective plate over the bolt;
- (c) placing the crossbar over the bolt and aligning the crossbar with the first protective plate;
- (d) positioning the second protective plate over the bolt above the crossbar and aligning the second protective plate with the crossbar;
- (e) placing the washer and nut over the bolt and fastening them loosely;
- (f) aligning the crossbar to the sub-frame of the trailer by equalizing the distance between the crossbar and the sub-frame at a point on each side of the crossbar which is half the width of the sub-frame from the center mark of the crossbar;
- (g) tightening the nut to secure the position of the crossbar;
- (h) measuring using a measuring tape the distance on each side between an end of the crossbar and the longitudinal axis of the first axle;
- (i) adjusting the first axle to equalize the distance between the first axle and the crossbar on each side; and
- (j) repeating steps (h) and (i) for each other trailer axle.

* * * * *